US012594467B2

(12) United States Patent
Bechter et al.

(10) Patent No.: US 12,594,467 B2
(45) Date of Patent: Apr. 7, 2026

(54) ADHESIVE SYSTEM FOR INCREASING THE ADHESION BETWEEN A DEVICE AND THE SKIN OF A USER

(71) Applicant: NOLAX AG, Sempach Station (CH)

(72) Inventors: Andreas Bechter, Oftringen (CH); Claude Hosotte, Michelbach le Haut (FR); Robertino Engel, Suhr (CH); Silvana Müller, Hilpoltstein (DE)

(73) Assignee: NOLAX AG, Sempach Station (CH)

( * ) Notice: Subject to any disclaimer, the term of this patent is extended or adjusted under 35 U.S.C. 154(b) by 1211 days.

(21) Appl. No.: 16/981,506

(22) PCT Filed: Mar. 18, 2019

(86) PCT No.: PCT/EP2019/056726
§ 371 (c)(1),
(2) Date: Sep. 16, 2020

(87) PCT Pub. No.: WO2019/179952
PCT Pub. Date: Sep. 26, 2019

(65) Prior Publication Data
US 2021/0060388 A1 Mar. 4, 2021

(30) Foreign Application Priority Data

Mar. 19, 2018 (EP) ..................................... 18162484

(51) Int. Cl.
| | |
|---|---|
| *C09J 175/04* | (2006.01) |
| *A63B 43/00* | (2006.01) |
| *B05D 1/26* | (2006.01) |
| *C08L 33/08* | (2006.01) |
| *C08L 39/06* | (2006.01) |
| *C09J 9/00* | (2006.01) |

(52) U.S. Cl.
CPC .............. *A63B 43/005* (2013.01); *B05D 1/26* (2013.01); *C08L 33/08* (2013.01); *C08L 39/06* (2013.01); *C09J 9/00* (2013.01); *C09J 175/04* (2013.01); *A63B 2209/10* (2013.01); *Y10T 428/2896* (2015.01)

(58) Field of Classification Search
None
See application file for complete search history.

(56) References Cited

U.S. PATENT DOCUMENTS

| | | | |
|---|---|---|---|
| 2014/0079900 A1 | 3/2014 | Ramirez | |
| 2015/0037555 A1* | 2/2015 | Mai ..................... | C08G 18/0819 |
| | | | 428/339 |
| 2016/0310802 A1 | 10/2016 | Wakibayashi et al. | |

FOREIGN PATENT DOCUMENTS

| | | | |
|---|---|---|---|
| CA | 2 121 959 A1 | 10/1994 | |
| DE | 202014002091 U1 * | 5/2014 ............. C09J 7/0296 |
| EP | 0 622 436 A1 | 11/1994 | |
| EP | 3 260 510 A1 | 12/2017 | |
| GB | 2 115 431 A | 9/1983 | |
| GB | 2 382 762 A | 6/2003 | |

OTHER PUBLICATIONS

"Water-Activated Double-Sided_Adhesive Tapr or Sheet", Machine translation of JPWO2016186017, Mar. 15, 2018 (Year: 2018).*
Standard Test Method for Peel Resistance of Adhesives, ASTM D1876-01, retrieved on Nov. 30, 2023 (Year: 2023).*
Standard Test Method for Peel Resistance of Adhesives, ASTM D3121-06, retrieved on Nov. 30, 2023 (Year: 2023).*
Machine translation of DE202014002091 U1, Feb. 4, 2014 (Year: 2014).*
European Search Report Corresponding to 18162484 mailed Oct. 10, 2018.
International Search Report Corresponding to PCT/EP2019/056726 mailed Jun. 4, 2019.
Written Opinion Corresponding to PCT/EP2019/056726 mailed Jun. 4, 2019.

* cited by examiner

*Primary Examiner* — Anish P Desai
(74) *Attorney, Agent, or Firm* — Finch & Maloney PLLC

(57) ABSTRACT

An adhesive system for increasing the adhesion between a device and the skin of a user. The adhesive system has a first coating component for applying to the device and a second coating component for applying to the skin. The first coating component and the second coating component each have a relatively low surface tackiness. However, upon contact of the first coating component with the second coating component, a relatively high degree of adhesion is obtainable. A method for producing an adhesion effect, a kit, and a use of an adhesive system is also disclosed.

1 Claim, No Drawings

ADHESIVE SYSTEM FOR INCREASING THE ADHESION BETWEEN A DEVICE AND THE SKIN OF A USER

The invention relates to an adhesive system for increasing the adherability between a piece of equipment and the skin of a user, to a method for generating an adhesive effect, to a kit for an adhesive system, and also to the use of an adhesive system, of a first coating component, and of a second coating component.

The use of resins for increasing the adherability between a piece of equipment and the palm of a user is known for example from the sport of handball. Used most frequently in handball is plant resin, which is intended to increase the grip of the ball and so enables better ball control. Depending on region, however, the use of synthetic resin is also possible. Plant resin is notable for particularly high tack. Plant resin, however, is difficult to remove from the skin and from the clothing, so necessitating the use of specific cleaning agents. Contact between the ball and the court floor likewise results in the resin being transferred to the court floor, and subsequently necessitating costly and laborious cleaning. Synthetic resin is indeed relatively easy to remove with mild cleaning agents, but the adhesive effect is much smaller.

An alternative option is to coat a piece of equipment with an acrylate possessing PSA (pressure-sensitive adhesive) properties. This initially generates an adhesive effect between the piece of equipment and the skin. This adhesive effect, however, quickly subsides, owing to the accumulation of dust, among other things, on the tacky surface.

Other approaches to a solution involve modifying the surface material of a piece of sports equipment, as described in US 2016/0310802 A1, for example. Modified surfaces, however, may suffer wear over time and in an adverse scenario may infringe competitive rules.

Also known from the prior art is the mounting of adhesive pads having a slip-resistant outer surface to parts of the hand, this being described for example in GB 2 382 762 A or in EP 3 260 510 A1. A disadvantage of such pads, however, is that they may become loose during play. Removing the adhesive pads is painful and may cause skin irritation. Moreover, the use of such pads may infringe competitive rules.

It is therefore an object of the invention to overcome the disadvantages of the prior art.

An object of the invention more particularly is to provide an adhesive system which enables very good adhesion between a piece of equipment and the skin of a user, but without leaving sticky residues. A further object of the invention is to provide a skin-friendly adhesive system.

These objects are achieved by the apparatuses, methods, and uses that are defined in the independent claims. Further exemplary embodiments are apparent from the dependent claims.

The invention relates to an adhesive system for increasing the adherability between a piece of equipment, more particularly a ball, and the skin of a user. The adhesive system comprises a first coating component, preferably an equipment coating component, for application to at least part of the piece of equipment, and a second coating component, preferably a skin coating component, for application to at least part of the skin of the user, more particularly of an inside of the palm, or of a fingertip. The first coating component and the second coating component each per se have a surface tack>35 cm, preferably >40 cm, according to the ASTM standard D3121-06 rolling ball test. On contact of the first coating component with the second coating component, an adhesion is attainable of between 2 and 20 N/25 mm, preferably an adhesion of between 2.5 and 15 N/25 mm, more preferably an adhesion of between 5 and 12 N/25 mm, more preferably still of between 6 and 10 N/25 mm, very preferably between 7 and 9 N/25 mm, according to a T-peel test.

An adhesive system of this kind has surprisingly shown that the contacting of the first coating component with the second coating component results in a strong adhesion, causing the piece of equipment to remain adhering to the skin without great application of force. At the same time, however, there is substantially no adhesive transfer from the piece of equipment to the skin and vice versa. Since both coating components per se are not tacky, there is hardly any adhesion of dust or other extraneous elements to the hands and the pieces of equipment.

It is an advantage of the adhesive system of the invention that the respective coating component can be provided to exactly those locations on the piece of equipment and on the skin where the adhesive effect is desired. This makes it possible on the one hand to save on adhesive material, while on the other hand neither the piece of equipment nor the skin is unnecessarily burdened.

The piece of equipment can be, for example, a handball. Other pieces of sports equipment as well are conceivable, however; for example, a javelin, a pole-vaulting pole, a relay baton, a gymnastics beam, or a tennis racket. Also conceivable are musical instruments, tools, walking aids, or household appliances.

The first coating component may be a dispersion, preferably a polyurethane dispersion. Since the integrity of polyurethanes is increased by addition of crosslinkers, it is also possible for a crosslinker, such as an isocyanate, for example, to be added to the first coating component.

The first coating component may further comprise a wetting agent, which ensures sufficient wetting on synthetic handball leather, for example. Water may be added to the dispersion in order to reduce the viscosity, allowing the coating component to be applied evenly to the piece of equipment.

Conceivable alternatives to a polyurethane dispersion are other compounds having cold seal properties: for example, but not exclusively, polyisoprene, polyethylene-vinyl acetate, or polychloroprene.

A coating of this kind ensures an adhesion between the first and second coating components that is comparable with that of standard commercial handball resin. The coating per se is grippy, but not sticky. Hardly any dirt or dust remain adhering to a piece of equipment coated with the first coating component. At the same time it is compatible with virtually all materials, without attacking them. There is substantially no transfer of the first coating component to the surroundings. In the case where the first coating component is utilized for the coating of a handball, accordingly, the coating component undergoes substantially no transfer to the court floor.

The first coating component, depending on its use, may also comprise an acrylate dispersion, a polyisoprene dispersion, a polyethylene-vinyl acetate dispersion, a polychloroprene dispersion, or mixtures thereof. These dispersions may be present with or without conventional crosslinking systems. Sulfur-containing compounds, for example, may serve as a crosslinking system for polyisoprene dispersions.

The first coating component may in principle be optimized for adhesion on the corresponding surface through the addition of additives.

The second coating component may comprise a dispersion of polyurethane and at least one additive. The additive may be selected from the group consisting of: polyvinylpyrrolidone, copolymers thereof or modified polyvinylpyrrolidone; acrylate dispersions; dispersions and solutions of sugar-based raw materials, more particularly pectins, gum arabic, cellulose derivatives, or rubber; other polyurethane dispersions; silane additives; silicone, or mixtures thereof.

Polyvinylpyrrolidone, for example, ensures that the second coating component adheres on the skin; the polyurethane dispersion ensures adhesion between skin component and second coating component. Alternatively or additionally to the polyvinylpyrrolidone, the other aforementioned additives may be used.

Since the second coating component is intended for application to the skin, the additions must be skin-compatible and toxicologically unobjectionable.

The first and second coating components are preferably matched to one another so as to attain optimum adherability between the coating components.

At least one of the coating components may be alcohol-based. Alcohol-based coatings reduce the drying time relative to water-based coatings.

A further aspect of the invention relates to a method for generating an adhesive effect between a piece of equipment and the skin of the user by means of an adhesive system, preferably an adhesive system as described above. The method comprises the steps of:

provide a first coating component, applying the first coating component to at least part of a piece of equipment, preferably a handball, drying the first coating component, providing a second coating component, applying the second coating component to at least part of the skin of the user, preferably of an inside of the palm, or of a fingertip, drying the second coating component.

Both coating components each per se have a surface tack>35 cm, preferably >40 cm, according to the ASTM standard D3121-06 rolling ball test.

The method further comprises the following step:

contacting the at least partly coated piece of equipment with the at least partly coated skin.

On contact of the first coating component with the second coating component, an adhesion is attained of between 2 and 20 N/25 mm, preferably an adhesion of between 2.5 and 15 N/25 mm, more preferably an adhesion of between 5 and 12 N/25 mm, more preferably still between 6 and 10 N/25 mm, and very preferably between 7 and 9 N/25 mm, according to a T-peel test.

During the use of the coating components as well, for example when a coating component is worn on a part of an inside area of the hand, the low tack is advantageous: there is hardly any transfer of coating component to clothing, other articles, or any contamination with dust. Adhesion is attained only when the coating components are brought together. This adhesion allows the secure holding and handling of a piece of equipment. At the same time there is substantially no transfer of the one coating component to the other.

The piece of equipment may, as described above, be another piece of sports equipment: for example, a javelin, a pole-vaulting pole, a relay baton, a gymnastics beam, or a return-play racket/bat. It is also conceivable for the piece of equipment to be a musical instrument, a tool, a walking aid, a household appliance, or an everyday item such as a mobile telephone, for example.

The first coating component and the second coating component are preferably configured as described above. The coating components may be applied using an application aid or by hand. Examples of conceivable application aids are spray cans, roll-on sticks, sponge applicator tubes, stamping pads, glue sticks, or brushes.

Depending on the mode of application and the use, the first coating component and the second coating component may be liquid, gel-like, or in the form of a paste.

The layer thickness of the freshly applied, respectively first and second coating component before drying is preferably between 5 and 100 μm, preferably 35 and 70 μm, and very preferably 55 and 65 μm.

The drying time of the first coating component may be between and 35 min, preferably 30 min. The drying time of the second component may be between 2 and 15 min, preferably 5 and 10 min. The drying times may be shortened by means of additions, drying technologies, or coating technologies.

The application of the first and/or second coating component may be repeated at least once, in order thus to ensure an ongoing adhesive effect.

A further aspect of the invention relates to a kit for an adhesive system, more particularly for an adhesive system as described above, for generating an adhesive effect between a piece of equipment and the skin of a user. The kit comprises a first coating component for application to the piece of equipment, and a second coating component for application to the skin, and also operating instructions for the use of the coating components, more particularly in a method as described above. The kit may optionally include an application aid for the first and/or second coating components.

The coating components and optional application aids may be configured as described above.

An advantage of the kit is that it comprises all the components of the adhesive system, in order to attain an ideal adhesion outcome. As a kit, the individual components can be readily stored and transported together, so that none of the components is forgotten or lost.

The kit may additionally comprise a cleaning lotion. A cleaning lotion of this kind allows the coating components to be removed easily from the skin of the user and/or from the piece of equipment. Ideally, the cleaning lotion is formulated for the removal of the coating components and at the same time is highly compatible with skin. The kit may also contain different cleaning lotions for the first and second coating components.

A further aspect relates to the use of an adhesive system, as described above, for generating an adhesive effect between a piece of equipment and the skin of a user.

A further aspect also relates to the use of a first coating component in an adhesive system, preferably as described above, together with a second coating component, for generating an adhesive effect between a piece of equipment and the skin of a user.

A further aspect also relates to the use of a second coating component in an adhesive system, preferably as described above, together with a first coating component, for generating an adhesive effect between a piece of equipment and the skin of a user.

T-Peel Test

The T-peel test is carried out as follows:

The test strips coated with the coating components are cut from a representative specimen of the material (a polyester film 22 μm thick, coated with the coating component). The strips are 25 mm wide and have a length of 150 mm in the running direction. The cut must be clean and straight. Six test strips are made available per coating component.

The test conditions are to be chosen as follows: 23° C.±2° C. and 50%±5% relative humidity. All of the test strips must be conditioned for at least 12 hours before the test.

Then, in the test method, around 100 mm of the test strip are adhered to the test material with gentle finger pressure. The samples are subsequently rolled on with a rolling-on machine, FINAT standard press-on roller, 2 kg, with a speed of 10 mm/second, twice in both directions. The bonded test strips are conditioned for 20 minutes. The test strip coated with the second coating component is clamped into the upper jaw, and the test strip coated with the first coating component into the lower jaw, of the tensile testing machine, resulting in a peel angle of 180° C. The test strip is then pulled apart with a speed of 300 ram/min.

Insofar as they are not contradictory, supplementary details concerning the T-peel test can be found in the ASTM standard D1876-01. In the case of contradictory details, the details stated above take precedence.

EXAMPLE 1: USE IN THE HANDBALL SPHERE

Production and Composition of the Coatings

Equipment Coating Component

The equipment coating component is applied to the handball to obtain adhesion between skin and handball.

Composition:

| Raw materials | | Fraction |
|---|---|---|
| Composition | Example | [wt %] |
| Polyurethane dispersion | Baymedix AD111 from Covestro | 85-95 |
| Water, deionized | n/a | 5-15 |
| Wetting agent | Surfynol PSA 336 | 0-1 |

Water and wetting agent are added to the PU dispersion, and then the three ingredients are mixed with one another by stirring.

Skin Coating Components:

The skin coating component is applied to the hand to obtain adhesion between handball and hand.

Skin Coating Component 1

Composition:

| Raw materials | | Fraction |
|---|---|---|
| Composition | Example | [wt %] |
| Aqueous polyvinyl-pyrrolidone (PVP) solution, 20%, K value: 90 | "Luvitec K90 solution approx. 20%" from BASF | 40-60 |
| Polyurethane dispersion (PUD), 50%, pH: 6-9 | Baymedix AD111 from Covestro | 60-40 |

The PVP solution is added to the PU dispersion, and then the two ingredients are mixed with one another by stirring.

Skin Coating Component 2

Composition:

| Raw materials | | Fraction |
|---|---|---|
| Composition | Example | [wt %] |
| Acrylate dispersion | "Collano DP 7011" from Collano | 5-20 |
| Polyurethane dispersion (PUD), 50%, pH: 6-9 | Baymedix AD111 from Covestro | 80-95 |

The acrylate dispersion is added to the PU dispersion, and then the two ingredients are mixed with one another by stirring.

Use of the Coatings

Application of Equipment Coating Component:

The equipment coating component is applied using a brush roller to a handball and then dried for 30-35 minutes. The drying time of the ball coating component may be influenced by addition of additives, the mode of drying, or the mode of coating. The layer thickness of the dry ball coating achieved using the brush roller is between 30 and 50 μm.

Application of Skin Coating Component:

The skin coating component is applied using a brush to fingertips and palms and then dried for 3-10 minutes. The drying time of the skin coating component may be influenced by addition of additives, the mode of drying, or the mode of coating. Where the coating technique described above is employed, the layer thickness of the dried skin coating is between 11 and 66 μm.

Comparison of the Coating Components to Handball Resin

Various formulations were tested for adhesive transfer, surface tack, and adhesion. The composition for the ball coating component was kept constant here, while the composition of the skin coating component was varied. The reference used was the "G-Resin for Handball", manufactured by Molten Europe GmbH.

Composition of the formulations (details in percent by weight):

| | Handball resin (resin) | Ball coating (BB) | Skin coating 1 (H1) | Skin coating 2 (H2) |
|---|---|---|---|---|
| PUD | | 91.9 | 50 | 80 |
| Aqueous PVP solution | | | 50 | |
| Acrylate dispersion | | | | 20 |
| Wetting agent | | 0.8 | | |
| Water | | 7.3 | | |
| Handball resin | 100 | | | |

1. Ball Coating Component (BB) and Skin Coating Component 1 (H1) Adhesive Transfer:

In order to ascertain the extent to which an adhesive leaves residues on other surfaces, the "finger grip test" technique was developed. This involves the coating of skin (in this case, the tip of the right-hand index finger of a test individual) and of synthetic handball leather with the coatings under investigation. Prior to application, the fingertip is cleaned with isopropanol and the coating is dried in air at room temperature for three to five minutes. The ball coating is applied by means of a doctor blade with a coating weight of 2.5 g/m2 to the handball leather, and the coated substrate is dried at 50° C. for at least 30 minutes.

With application of force (20 to 25 N), fingertip and ball are pressed against one another for 10 seconds, after which the finger is rolled off sideward from the (coated) synthetic leather.

The adhesive transfer is evaluated qualitatively.

The adhesive transfer of H1 and BB is compared using the finger grip test with the adhesive transfer of resin.

Results:

| Criterion | Both sides resin | Both sides BB | One side BB, one side H1 |
|---|---|---|---|
| Tack of individual surface | +++ | + | + |
| Adhesion between coated surfaces | +++ | +++ | +++ |
| Adhesive transfer | +++ | +++ | – |
| Cleaning effort | +++ | + | – |

Key:
+++ substantial,
+ slight,
– none

Adhesion:

The adhesion between H1 and BB was compared with the adhesion of resin using a T-peel test (as described above). For this purpose, the coating components BB and H1 were applied by doctor blade to a polyester film 22 μm thick (support material) and dried at 50° C. for 30 minutes; the resulting layer thicknesses were 29±3 and 20±2 μm, respectively. Resin was dissolved in toluene (resin:toluene mixing ratio 2:1), then applied by doctor blade to a polyester film 22 μm thick, and dried at 50° C. for 15 minutes. The resulting layer thickness was 20±4 μm. An explanation for the higher T-peel values between H1 and BB is that the fracture mode is different; resin is inherently more elastic and therefore tends more toward cohesive fracture.

Results:

| System | Adhesion [N/25 mm] |
|---|---|
| BB vs. H1 coating | 5-7 (Adhesive fracture between equipment coating and skin coating. In some cases adhesive fracture with respect to the support material as well) |
| Resin vs. resin coating | 2.5-3 (Cohesive fracture) |

Surface Tack:

The surface tack of BB and H1 was compared with that of resin using the rolling ball test according to ASTM standard 3121-06. For this purpose, the coating components BB and H1 were applied by doctor blade to a polyester film 22 μm thick, and dried at 50° C. for 30 minutes; the resulting layer thicknesses were 29±3 and 20±2 μm, respectively. Resin was dissolved in toluene (resin:toluene mixing ratio 2:1), then applied by doctor blade to a polyester film 22 μm thick, and dried at 50° C. for 15 minutes. The resulting layer thickness was 20±4 μm. The results in the table below show that H1 and BB have a lower surface tack than resin.

Results:

| System | Rolling Ball [cm] |
|---|---|
| H1 | >40 |
| BB | >40 |
| Resin | 26-31 |

2. Ball Coating Component (BB) and Skin Coating Component 2 (H2)

As well as PVP, other systems were also considered as skin-adhering component of the skin coating component.

For example, films of acrylate dispersions having PSA properties are known to possess effective skin adhesion.

Adhesive transfer, surface tack, and adhesion of the formulation H2 were determined as described above. For this purpose, the coating components BB and H2 were applied by doctor blade to a polyester film 22 μm thick, and dried at 50° C. for 30 minutes, the resulting layer thicknesses were 29±3 and 30±3 μm, respectively.

In view of the low acrylate concentration, there is no significant increase in the surface tack of H2 relative to that of H1. The adhesion between H2 and BB, as well, is comparable with that between H1 and BB (cf. table below).

Results of Surface Tack and Adhesion of BB and H2:

| Test method/[unit] | Value |
|---|---|
| Rolling ball test/[cm] | >40 |
| T-peel test/[N/25 mm] | 7-8.5 (Adhesive fracture between ball coating and skin coating. In some cases, adhesive fracture with respect to support material as well) |

However, the acrylate concentration is too low to generate sufficiently high skin adhesion; on contact H2 is transferred to BB. Higher acrylate concentrations would entail an increased surface tack, which would not be in the sense of the invention.

Comparison of Additives: H1 vs. H2

| Criterion | Both sides handball resin | One side BB One side H1 | One side BB One side H2 |
|---|---|---|---|
| Tack of individual surface | +++ | + | + |
| Adhesion between coated surfaces | +++ | +++ | +++ |
| Adhesive transfer | +++ | – | + |
| Cleaning effort | +++ | – | + |

Key:
+++ substantial,
+ slight,
– none

EXAMPLE 2: USE IN THE POLE-VAULTING SPHERE

The equipment coating component identified in example 1 (BB) is applied using a brush roller to the upper part of a glass fiber pole for pole vaulting, and dried in the air for 45 minutes. The layer thickness is between 40 and 70 μm.

The skin coating component identified in example 1 (H1) is applied using a brush to the inside hand area of the pole vaulter, and dried in the air for 10 minutes. The layer thickness is between 11 and 66 μm.

Adhesive transfer, surface tack, and adhesion of the formulation were assessed qualitatively in comparison to tree resin, grip tapes with and without magnesia, adhesive grip tapes, and spray adhesive.

The formulation proves to have very good adhesion especially in comparison to grip tapes and/or magnesia. Nevertheless, it is also possible to exert control over the push-off and release of the pole in the concluding flight phase of a pole vault. In comparison to tree resin, the advantages arise that are associated with the reduced surface tack. In other words, the coating components simplified handling, and contamination by dust and other foreign particles is reduced. By virtue of the thin application layer, the uniform pole diameter required by the competition rules is maintained.

EXAMPLE 3: USE IN THE E-SPORTS SPHERE

The equipment coating component (BB) identified in example 1 is applied using a brush to the joystick elements of the controller of a games console, and dried in the air for 25 minutes. The layer thickness is between 30 and 60 µm.

The skin coating component (H1) identified in example 1 is applied using a brush to the fingertips of the gamer, and dried in the air for 10 minutes. The layer thickness is between 11 and 66 µm.

Even with a relatively thin application layer, the formulation has positive effects on the temporal and spatial precision with which commands are triggered, ultimately increasing the performance of the player. Over long playing times, the hand also becomes fatigued less quickly. In contrast to known "gamer gloves" or slip-resistant patches which are adhered to the fingertips, the adhesion system is pleasing to wear. In comparison to "gamer grip", which like magnesia dries skin and prevents perspiration, the adhesive effect is superior.

10

The invention claimed is:

1. An adhesive system for increasing the adherability between a piece of equipment and skin of a user, the adhesive system comprising a first coating component for application to at least part of the piece of equipment, and a second coating component for application to at least part of the skin, inside of the palm, or of a fingertip, of the user, wherein the first coating component is an aqueous dispersion, and wherein the second coating component is an aqueous dispersion, where the first coating component and the second coating component each have per se surface tack>35 cm after drying according to the ASTM standard D3121 06 rolling ball test, wherein on contact of the first coating component with the second coating component an adhesion is attainable of between 2.5 and 15 N/25 mm after drying according to a T-peel test, and wherein the first coating component comprises a polyurethane, an acrylate, a polyisoprene, a polyethylene-vinyl acetate, or mixtures thereof; and wherein, if the first coating component comprises a polyurethane, the first coating component does not comprise a crosslinker.

* * * * *